(12) United States Patent
Dos Santos

(10) Patent No.: US 10,363,600 B2
(45) Date of Patent: Jul. 30, 2019

(54) MOLD ASSEMBLY, MANUFACTURING METHOD AND ROTATING ELECTRICAL MACHINE HOUSINGS

(71) Applicant: WEG Equipamentos Elétricos S.A., Jaraguá do Sul (BR)

(72) Inventor: Jose Roberto Dos Santos, Jaraguá do Sul (BR)

(73) Assignee: WEG Equipamentos Elétricos S.A., Jaragúa Do Sul (BR)

( * ) Notice: Subject to any disclaimer, the term of this patent is extended or adjusted under 35 U.S.C. 154(b) by 128 days.

(21) Appl. No.: 15/320,298

(22) PCT Filed: Jul. 22, 2014

(86) PCT No.: PCT/BR2014/000252
§ 371 (c)(1),
(2) Date: Dec. 19, 2016

(87) PCT Pub. No.: WO2016/011514
PCT Pub. Date: Jan. 28, 2016

(65) Prior Publication Data
US 2017/0182548 A1    Jun. 29, 2017

(51) Int. Cl.
*B22C 9/22* (2006.01)
*H02K 5/20* (2006.01)
*H02K 15/14* (2006.01)
*B22C 9/02* (2006.01)
*H02K 1/20* (2006.01)
*H02K 15/02* (2006.01)

(52) U.S. Cl.
CPC .................. *B22C 9/22* (2013.01); *B22C 9/02* (2013.01); *H02K 1/20* (2013.01); *H02K 5/20* (2013.01); *H02K 15/02* (2013.01); *H02K 15/14* (2013.01)

(58) Field of Classification Search
CPC .............. B22C 9/22; B22C 9/00; B22D 25/02
See application file for complete search history.

(56) References Cited

U.S. PATENT DOCUMENTS 5,630,461 A * 5/1997 CoChimin .............. B22C 9/046
164/34
5,939,808 A    8/1999 Adames
2012/0146435 A1    6/2012 Bott et al.

FOREIGN PATENT DOCUMENTS

CA    2625357 A1    9/2008
ES    2359057 A1    5/2011
JP    H1198783 A    4/1999
(Continued)

OTHER PUBLICATIONS

International Search Report (including English translation) for related International Patent Application No. PCT/BR2014/000252 dated Mar. 12, 2015.
(Continued)

*Primary Examiner* — Kevin P Kerns
*Assistant Examiner* — Steven S Ha
(74) *Attorney, Agent, or Firm* — Troutman Saunders LLP; Ryan A. Schneider; Christopher Close Jr.

(57) ABSTRACT

A mold assembly for rotating electrical machines housings, the mold having part of the cooling duct geometry on its side portion and another portion on the center mold, in order to eliminate the requirement of casting plugs. A rotating electrical machine housing manufactured from the mold assembly.

8 Claims, 5 Drawing Sheets

(56) References Cited

FOREIGN PATENT DOCUMENTS

| JP | 2011151951 A | 8/2011 |
|---|---|---|
| KR | 101365192 B1 | 2/2014 |

OTHER PUBLICATIONS

Written Opinion of the International Searching Authority for related International Patent Application No. PCT/BR2014/000252 dated Mar. 12, 2015.

* cited by examiner

MOLD ASSEMBLY, MANUFACTURING METHOD AND ROTATING ELECTRICAL MACHINE HOUSINGS

FIELD OF APPLICATION

This invention discloses a mold assembly for rotating electrical machine housings, comprising part of the cooling duct geometry on its side portion and another portion on the center mold, in order to eliminate the requirement of casting plugs. In a second aspect of this invention, a rotating electrical machine housing is disclosed, manufactured from the mold assembly proposed herein.

BACKGROUND OF THE INVENTION

In casting processes, critical operations are generally related to the molding of the piece and core molding of its components. The latter consists in obtaining plugs (normally made from refractory materials) and their addition to the molds, in order to form cavities, holes and indentations on the pieces.

An internal air circulation system, including cooling ducts inside the engine housing, is necessary for optimal functioning of large and medium-sized rotating electrical machines. Such composition enables the cooling means to effectively remove the heat generated from losses, a parameter that is intimately associated to the useful lifespan of the machine.

In case of engines with cast iron housings, the application of casting plugs is required to obtain such ducts. The main drawbacks regarding core molding are found in the variables introduced in the design specification, such as the possibility of beads and bubble formation due to inadequate gas removal, or in more extreme situations, ejection of liquid metal from within the molds. Another relevant factor is the correct positioning of elements that constitute the mold and the plug. The lack of proper control in this step may lead to dimensional deviations in amounts exceeding tolerance levels. Addressing all these variables lead to an increase in global cost of the process, affecting line automation.

Thus, in light of the foregoing, the demand for solutions that relinquish the core-making phase on the casting of large-scale engines is noticeable, as to enable viability on industrial scale.

DESCRIPTION OF THE STATE OF THE ART

In a casting process, the use of wooden or metal patterns deposited on a medium including oil-soaked sand is common. After the latter is packed, the mold or pattern is removed, and the cast metal is deposited over the cavity until it cools down. Failing to address proper operational conditions leads to the aforementioned unwanted events. This system is approached on patent JP59201659, which describes patterns for shaping mounting feet for fixing the housing of an electric engine. A second example is shown on patent JP 556148159, which discloses a mold for stators that is split into two halves joined by a locking mechanism.

An alternative approach is lost-foam casting (FEP-|fundição por espuma perdida), in which a polystyrene pattern is introduced in a medium containing dry sand under vibration. The pattern vaporizes in contact with the cast metal, preventing formation of unwanted beads or empty spaces; an illustrative example of this method is described on U.S. Pat. No. 6,109,333.

And attempt to reduce costs related to molding is suggested on document CN102101153, comprising the use of a mix between sea sand (75-90 mesh), bentonite and water, which is applied on a sand box under specific heating and pressure conditions for manufacturing of the required piece. Although there is an apparent reduction regarding residue generation and processing time, this patent application does not provide a solution for eliminating the core making phase altogether.

Document JP 2011-151951 discloses a method for manufacturing electric engines housings including a cooling system, comprising an additional structure previously arranged over the mold. The structure of cylindrical geometry aforementioned features a plurality of chisels at regular intervals and alternated from its upper and lower positions. This device seeks to provide a cooling system, particularly focused on automotive electric engines housings. It should be noted that the use of the method described is not applicable to large-scale engines. Besides, due to its building complexity, it is noted that the costs involved for manufacturing said structure would not be advantageous in relation to the currently known core making procedures. Similarly, this limitation may also be verified on document ES2359057, which describes a sand plug with a graded configuration, formed from curved parallel and spaced segments, arranged at regular intervals.

Document JP H11-098783 provides a four-cut mold for manufacturing dynamo-electrical machine housings, including wedges mounted on cavities externally arranged on the housing structure itself, peripherally over the cylindrical surface of the stator, outlining cavities.

Patent CA2625357, in turn, approaches the concept of cooling ducts integrated to the housing through molding. In this approach, the cooling ducts are arranged equidistantly and longitudinally through arced holes formed from the projection of an external wall over the housing. The focus of this proposal resides precisely on the D shape of the duct, which enables exposure of a larger surface area, finned to the cooling fluid. An evolution of this proposal is featured on the patent application US2012146435, in which the ducts, preferably manufactured in aluminum, are arranged in a zigzag configuration along the housing structure. It should be noted that both documents CA2625357 and US2012146435 require the use of casting plugs to obtain ducts integrated to the housing. Another drawback is the possible variation in external thickness of the casting, which would affect the shape of the duct.

In light of the foregoing, it is noticeable the lack of feasible solutions regarding the use of casting plugs for manufacturing large-scale electrical engines housings.

OBJECTIVE OF THE INVENTION

This invention seeks to overcome the drawbacks of the state of the art, eliminating the need for casting "plugs" for rotating electrical machines housings through a mold that comprises part of the ventilation duct geometry on its side portion and another portion on the center mold. The duct closing is done by two sealing covers similar to current covers.

In a second aspect of this invention, a rotating electrical machine housing is further disclosed, manufactured from the mold assembly proposed herein.

DETAILED DESCRIPTION OF THE INVENTION

The mold (1) proposed herein comprises portions 1a, 1b, 1c, 1d and 1e. Each one of these elements will be discussed in detail below.

Figure 1:
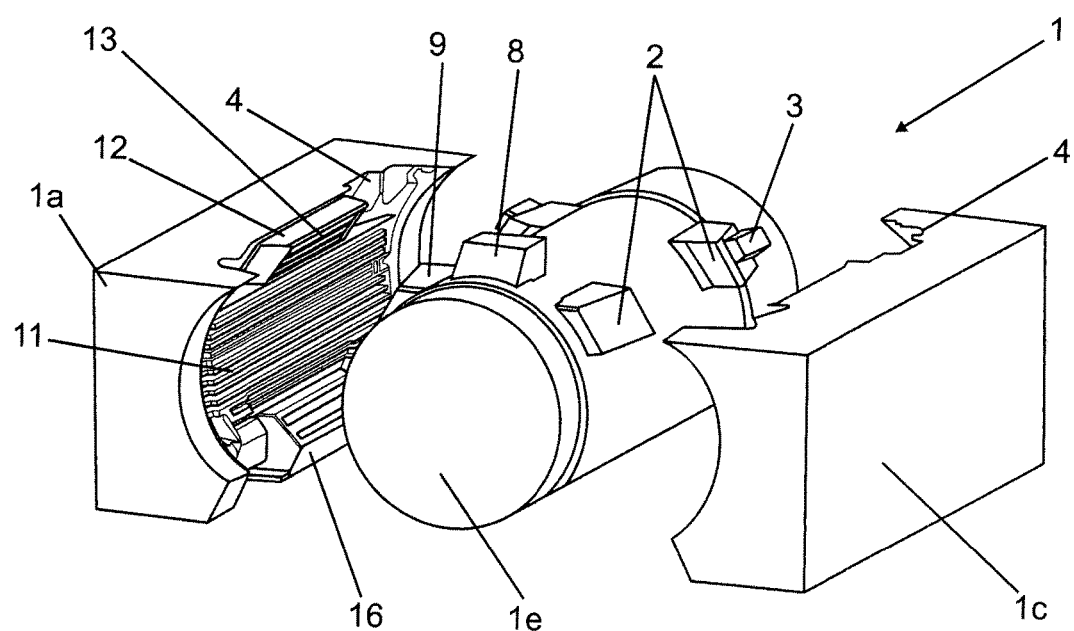
FIG. 1 shows a perspective view of the mold assembly.
Figure 2:
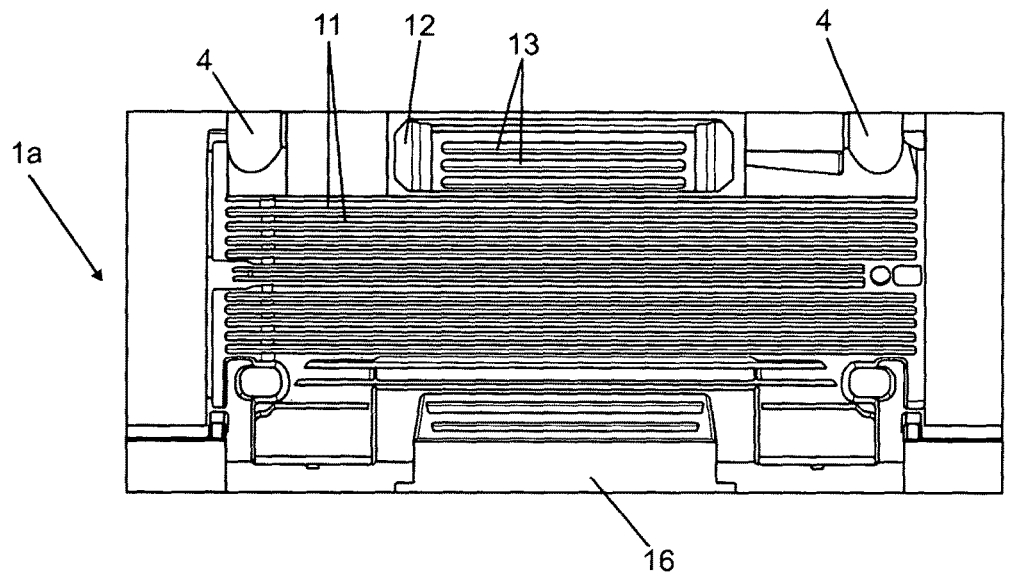
FIG. 2 shows a side view of portion 1a of the mold.
Figure 3:
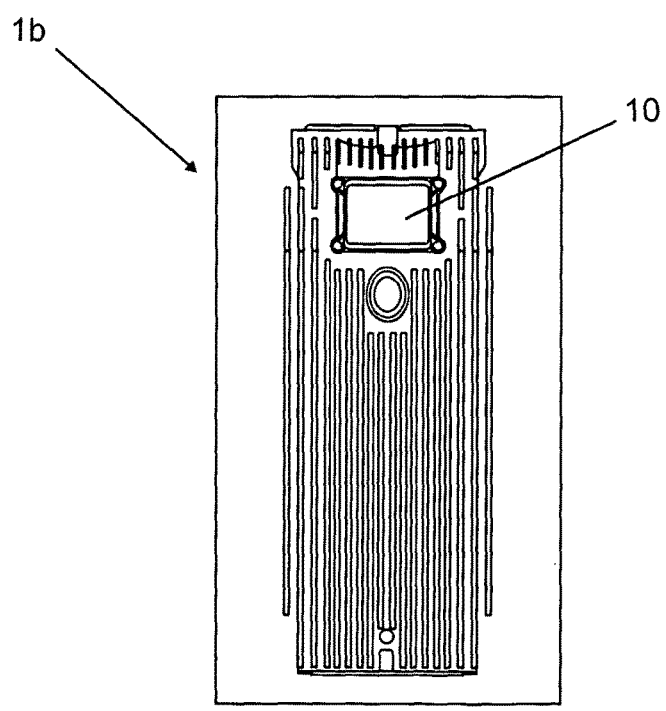
FIG. 3 shows a bottom view of portion 1b.
Figure 4:
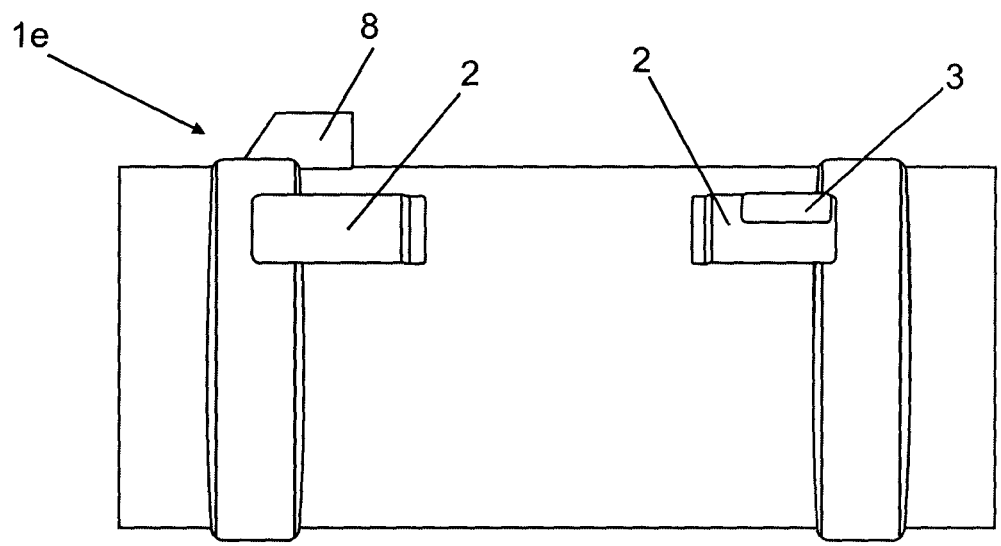
FIG. 4 shows a side view of the center portion 1e.
Figure 5:
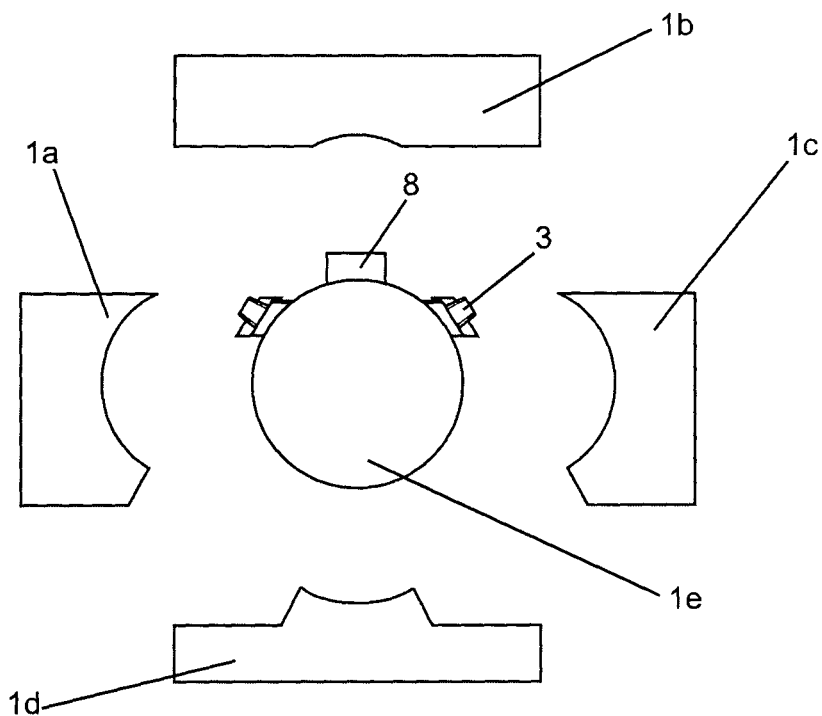
FIG. 5 shows a front view of the mold assembly claimed herein.

According to FIG. 1, portions 1a and 1c feature a symmetric profile, both being mounted laterally and externally onto the peripheral surface of the center portion 1e.

Portion 1a consists in a chiseled concave block; a plurality of parallel and continuous grooves (11) is found in its internal median region along its length.

On the bottom surface of said cavity, and adjacent to the region formed by grooves (11), a beveled structure (16) is projected against the external surface of portion 1e, intertwined with recesses of the internal cavity of portion 1a. Said recesses in association with the profile of the edges of the structure (16) shall outline the mounting feet of the housing. Considering the upper surface of portion 1a, a box (12) may be found lodging, internally, a plurality of grooves (13), which will shape the duct system on the peripheral region of the electrical machine housing. In its preferred assembly, a recess (4) is provided, placed abutting the box (12), which will communicate with the lock (3) in the center mold.

Portion 1b of the block profile will be attached to the upper region of portion 1e, comprising a recess (10) with a geometry that complements the locking structures (8), which are peripherally located onto portion 1e.

Figure 7:
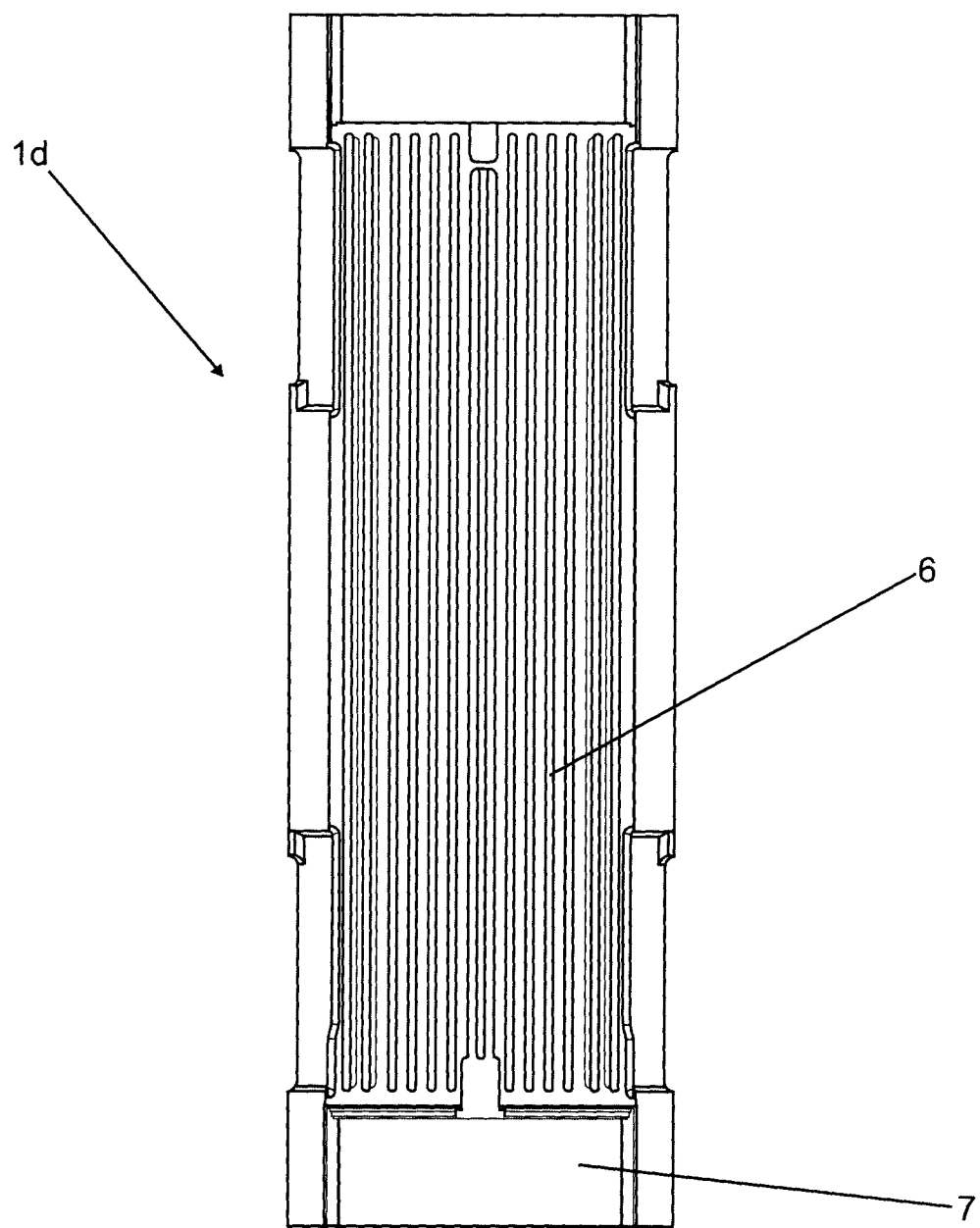
FIG. 7 shows an upper view of portion 1d.

In reference to FIG. 7, portion 1d features an external block profile that includes a region (6) formed from a plurality of reinforced grooves and ends (7), both arranged on a concave platform of said portion 1d.

Portion 1e corresponds to the center mold, which will shape the internal lodging region of the magnetic stator core (not shown in the figures). A cylindrical profile will be featured, in this sense, from which shoulders (2), (8) and (3) are radially projected.

Figure 6:
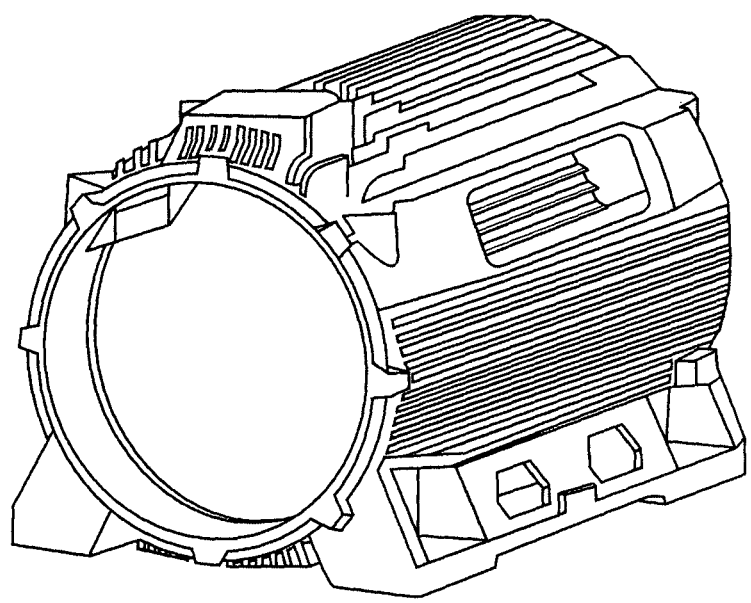
FIG. 6 shows a perspective view of the rotating electrical machine obtained from the mold.

FIG. 6 shows the rotating electrical machine housing obtained. The box (12), in association with the structures (9) of portion 1e shall outline the duct system on the rotating electrical machine, which will enable full removal of additional core-making procedures. The molding process for manufacturing said machine envisages the standard and relevant steps of the state of the art.

It shall be obviously apparent that other modifications and variants are considered within the scope of this invention, not restricted to what was previously exposed.

The invention claimed is:

1. A method of manufacturing a rotating electrical machine housing produced from a mold comprising:
    forming a mold comprising a top part, a bottom part, a first side part, a second side part and a center part;
    attaching a bracket portion extending from a peripheral surface of the center part to a top part recess formed in an inner surface of the top part;
    assembling the bottom part to the center part;
    engaging first and second shoulders extending from the peripheral surface of the center part into a side part recess formed in an inner surface of one of the first side part and the second side part;
    positioning box-shaped extensions formed in inner surfaces of the first and second side parts, respectively, over the peripheral surface of the center part; and
    depositing cast metal in the formed mold.

2. The method of claim 1, wherein the first side and the second side parts have a symmetric profile.

3. The method of claim 2, wherein at least one of the first side part and the second side part are mounted laterally and externally onto the peripheral surface of the center part.

4. The method of claim 1, wherein at least one of the first side part and the second side part comprises a plurality of parallel and continuous grooves in its inner face.

5. The method of claim 4, wherein a beveled structure extends from a bottom surface of the at least one of the first side part and second side part in proximity of the grooves.

6. A method of manufacturing a rotating electrical machine housing produced from a mold comprising:
    forming a mold comprising a top part, a bottom part, a first side part, a second side part and a center part;
    attaching a bracket portion extending from a peripheral surface of the center part to a top part recess formed in an inner surface of the top part;
    assembling the bottom part to the center part;
    engaging two sets of first and second shoulders extending from the peripheral surface of the center part into first and second side part recesses, respectively, formed in an inner surface of each of the first side part and the second side part;
    positioning box-shaped extensions formed in inner surfaces of the first and second side parts, respectively, over the peripheral surface of the center part; and
    depositing cast metal in the formed mold;
    wherein the first side and the second side parts have a symmetric profile; and
    wherein the first side part and the second side part are mounted laterally and externally onto the peripheral surface of the center part.

7. The method of claim 6, wherein each of the first side part and the second side part comprise a plurality of parallel and continuous grooves in its inner face.

8. The method of claim 7, wherein a beveled structure extends from a bottom surface of each of the first side part and the second side part in proximity of the grooves.

* * * * *